US011984689B2

(12) United States Patent
Pao et al.

(10) Patent No.: US 11,984,689 B2
(45) Date of Patent: May 14, 2024

(54) CONDUCTIVE HOUSING FOR CONNECTOR AND CONNECTOR COMPRISING THE SAME

(71) Applicant: STARCONN ELECTRONIC (Su Zhou) Co., LTD., Kunshan (CN)

(72) Inventors: Chung Nan Pao, New Taipei (CN); Fu Su, Kunshan (CN); Hong Yang Ping, Kunshan (CN); Qing Gu, Kunshan (CN); Dong Qi Kuang, Kunshan (CN)

(73) Assignee: STARCONN ELECTRONIC (Su Zhou) Co., LTD., Kunshan (CN)

( * ) Notice: Subject to any disclaimer, the term of this patent is extended or adjusted under 35 U.S.C. 154(b) by 59 days.

(21) Appl. No.: 17/678,053

(22) Filed: Feb. 23, 2022

(65) Prior Publication Data

US 2022/0294161 A1 Sep. 15, 2022

(30) Foreign Application Priority Data

Mar. 10, 2021 (CN) ......................... 202120509430.1

(51) Int. Cl.

| | |
|---|---|
| ***H01R 13/6594*** | (2011.01) |
| ***H01R 12/58*** | (2011.01) |
| ***H01R 12/71*** | (2011.01) |
| *H01R 13/648* | (2006.01) |
| *H01R 13/658* | (2011.01) |
| *H01R 13/6581* | (2011.01) |

(52) U.S. Cl.

CPC ......... *H01R 13/6594* (2013.01); *H01R 12/58* (2013.01); *H01R 12/714* (2013.01); *H01R 12/585* (2013.01); *H01R 12/71* (2013.01); *H01R 12/712* (2013.01); *H01R 13/648* (2013.01); *H01R 13/658* (2013.01); *H01R 13/6581* (2013.01)

(58) Field of Classification Search

CPC .. H01R 13/6594; H01R 12/58; H01R 12/714; H01R 12/585; H01R 12/71; H01R 12/712; H01R 13/648; H01R 13/658; H01R 13/6581

See application file for complete search history.

(56) References Cited

U.S. PATENT DOCUMENTS

2021/0028580 A1* 1/2021 Yang .................. H01R 13/6581

* cited by examiner

*Primary Examiner* — Abdullah A Riyami
*Assistant Examiner* — Justin M Kratt
(74) *Attorney, Agent, or Firm* — Samson G. Yu

(57) ABSTRACT

The disclosure relates to a conductive housing for the connector and a connector comprising the conductive housing. The conductive housing comprises a plurality of side surfaces, at least one of which comprising a plurality of terminal connection portions spaced apart from one another at an edge portion of the side surface, and a gap being formed between two adjacent terminal connection portions; and a plurality of terminal pins, each of which being connected to the respective terminal connection portion. The conductive housing further comprises at least one conductive elastic piece, one of which being connected between the two adjacent terminal connection portions to at least partially cover the gap between the two adjacent terminal connection portions. By means of such arrangement, the conductive elastic piece covers most areas between the terminal pins so as to enhance electromagnetic compatibility.

15 Claims, 3 Drawing Sheets

CONDUCTIVE HOUSING FOR CONNECTOR AND CONNECTOR COMPRISING THE SAME

TECHNICAL FIELD

The disclosure relates to a conductive housing for the connector and a connector comprising the conductive housing.

BACKGROUND

In a conventional conductive housing of a connector, there are substantially gaps between terminal pins (for example, fish-eye terminal pins), and electromagnetic compatibility (EMC) will be affected regardless whether or not the conductive housing is plugged into a printed circuit board (PCB).

SUMMARY

In order to overcome the above defects in the prior art, the disclosure provides a conductive housing for a connector. The conductive housing comprises a plurality of side surfaces, at least one of which comprising a plurality of terminal connection portions spaced apart from one another at an edge portion of the side surface, and a gap being formed between the two adjacent terminal connection portions; a plurality of terminal pins, each of which being connected to the respective terminal connection portion; and at least one conductive elastic piece, one of which being connected between the two adjacent terminal connection portions to at least partially cover the gap between the two adjacent terminal connection portions.

Further, a bottom end of each of the plurality of terminal connection portions is connected to the respective terminal pin, wherein a connection line between the bottom ends of the two adjacent terminal connection portions intersects with a part of the respective conductive elastic piece connected between the two adjacent terminal connection portions.

Further, an interference fit is formed between the conductive elastic piece and a PCB when the plurality of terminal pins of the conductive housing are installed in the PCB.

Further, each of the at least one conductive elastic piece comprises an abutting portion; and two elastic arm portions, the abutting portion being connected between the two elastic arm portions, and each of the two elastic arm portions being connected between the abutting portion and the respective terminal connection portion.

Further, the abutting portion and the two elastic arm portions are integrated.

Further, the abutting portion is configured to abut against a PCB when the plurality of terminal pins of the conductive housing are installed in the PCB.

Further, at least one of the two elastic arm portions comprises at least one first bent portion.

Further, the abutting portion comprises a second bent portion, a bending direction of the second bent portion being the same as a direction in which the terminal connection portion points toward the respective terminal pin, wherein a bending direction of the first bent portion is the same as or opposite to the bending direction of the second bent portion.

Further, the abutting portion comprises the second bent portion, a bending direction of the second bent portion being the same as a direction in which the terminal connection portion points toward the respective terminal pin.

Further, the abutting portion or at least one of the two elastic arm portions comprises a bent portion, a bending direction of the bent portion being parallel to a direction in which the terminal connection portion points toward the respective terminal pin, the bending direction of the bent portion being away from the terminal connection portion and extend upward or toward the edge portion of the side surface, or may even extend upward or toward the edge portion of the side surface in a manner of being inclined or forming an angle between the bent portion and a respective terminal connection portion.

Further, the two adjacent terminal connection portions, the conductive elastic piece connected between the two adjacent terminal connection portions, and the respective side surface form a closed loop.

Further, at least one of the plurality of side surfaces, the plurality of terminal pins, and the at least one conductive elastic piece are integrated.

Further, two opposite ends of the conductive elastic piece are connected to two respective and adjacent terminal connection portions respectively, or connected to the edge portion of the side surface between two respective and adjacent terminal connection portions, or connected to interface points of two respective and adjacent terminal connection portions with the edge portion of the side surface between the two respective and adjacent terminal connection portions.

Further, the conductive elastic piece can form a hollowed-out pattern, a large-area pattern or a non-hollowed-out pattern to cover the respective gap.

Further, the conductive elastic piece cover an area between terminal pins connected to the two respective and adjacent terminal connection portions.

The disclosure further provides a connector comprising the conductive housing described as above.

The disclosure further provides a connector. The connector comprises: a conductive housing comprises: a plurality of side surfaces, at least one of which comprising a plurality of terminal connection portions spaced apart from one another at an edge portion of the side surface, a gap being formed between two adjacent terminal connection portions; a plurality of terminal pins, each of which being connected to the respective terminal connection portion; and at least one conductive elastic piece, one of which being connected between the two adjacent terminal connection portions to at least partially cover the gap between the two adjacent terminal connection portions; and at least one connector body, the conductive housing at least partially surroundings the connector body.

By means of such arrangement, the conductive elastic piece covers most areas between the terminal pins so as to enhance electromagnetic compatibility, and the conductive elastic piece has elasticity, can be in interference fit with the printed circuit board to achieve reliable contact and repeatable plugging, and the conductive housing has a simple manufacturing process, a low cost and a low defective rate.

BRIEF DESCRIPTION OF THE DRAWINGS

The accompanying drawings are used for providing further understanding of the disclosure and constitute a part of the disclosure, and the schematic embodiments of the disclosure and the description thereof are used for explaining the disclosure and do not constitute an improper limitation on the disclosure. In the accompanying drawings.

DETAILED DESCRIPTION OF THE EMBODIMENTS

The technical solutions in the embodiments of the disclosure will be described in detail below in conjunction with the accompanying drawings in the embodiments of the disclosure. It should be noted that the embodiments of the disclosure and features in the embodiments may be combined with one another without conflict.

Figure 1:
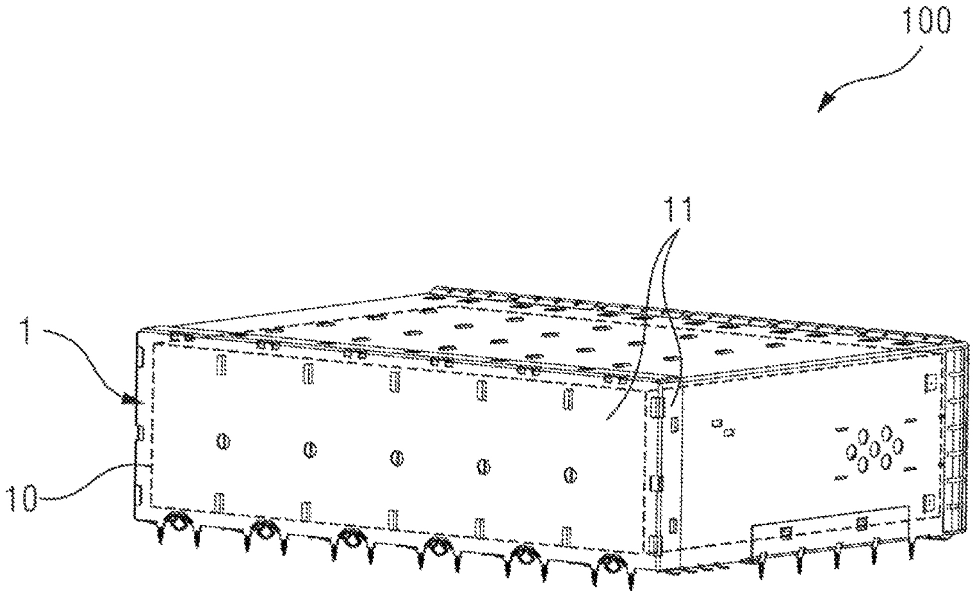
FIG. 1 is a schematic perspective view showing a connector of the disclosure, wherein a connector body located in a conductive housing is shown with dotted lines.
Figure 2:
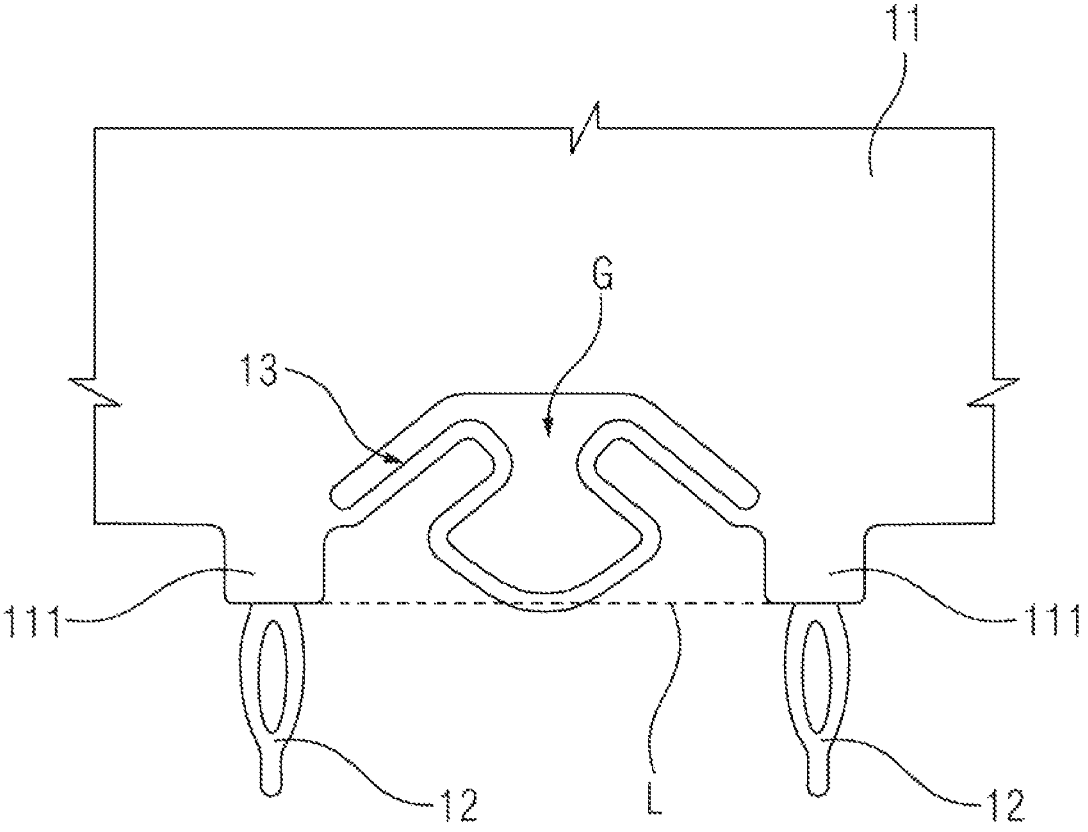
FIG. 2 is a partial schematic side view showing the conductive housing of the disclosure.

As shown in FIG. 1, the disclosure provides a connector 100. The connector 100 may comprise a conductive housing 1 (for example, a connector cage) and at least one connector body 10. The conductive housing 1 at least partially surrounds the connector body 10. The connector body 10 may comprise an insulating housing and a plurality of terminals fastened to the insulating housing, but the disclosure is not limited thereto. As shown in FIG. 1, the conductive housing 1 may comprise a plurality of side surfaces 11, that is, the conductive housing 1 is composed of a plurality of side surfaces 11, the plurality of side surfaces 11 being connected to one another to form an accommodating space therein. The plurality of side surfaces 11 at least partially surrounds the connector body 10, and the accommodating space is configured to accommodate the connector body 10 therein. At least one of the side surfaces 11 comprises a plurality of terminal connection portions 111 spaced apart from one another at an edge portion of the side surface 11, the edge portion of the side surface 11 being a bottom portion or a bottom edge portion of the side surface 11, rather than the portions or the connections where the plurality of side surfaces 11 are connected to one another. Each of the terminal connection portions 111 is perpendicular to an edge portion of a respective side surface 11 and extends or protrudes downward from the edge portion, and a gap G is formed between two adjacent terminal connection portions 111. With reference to FIGS. 1 and 2, they only illustrate a terminal connection portion 111 arranged on a side surface 11 of the conductive housing 1 respective to a back surface of the connector body 10, but the disclosure is not limited thereto, and a terminal connection portion 111 may also be arranged on a side surface 11 of the conductive housing 1 respective to a side surface of the connector body 10.

Figure 3:
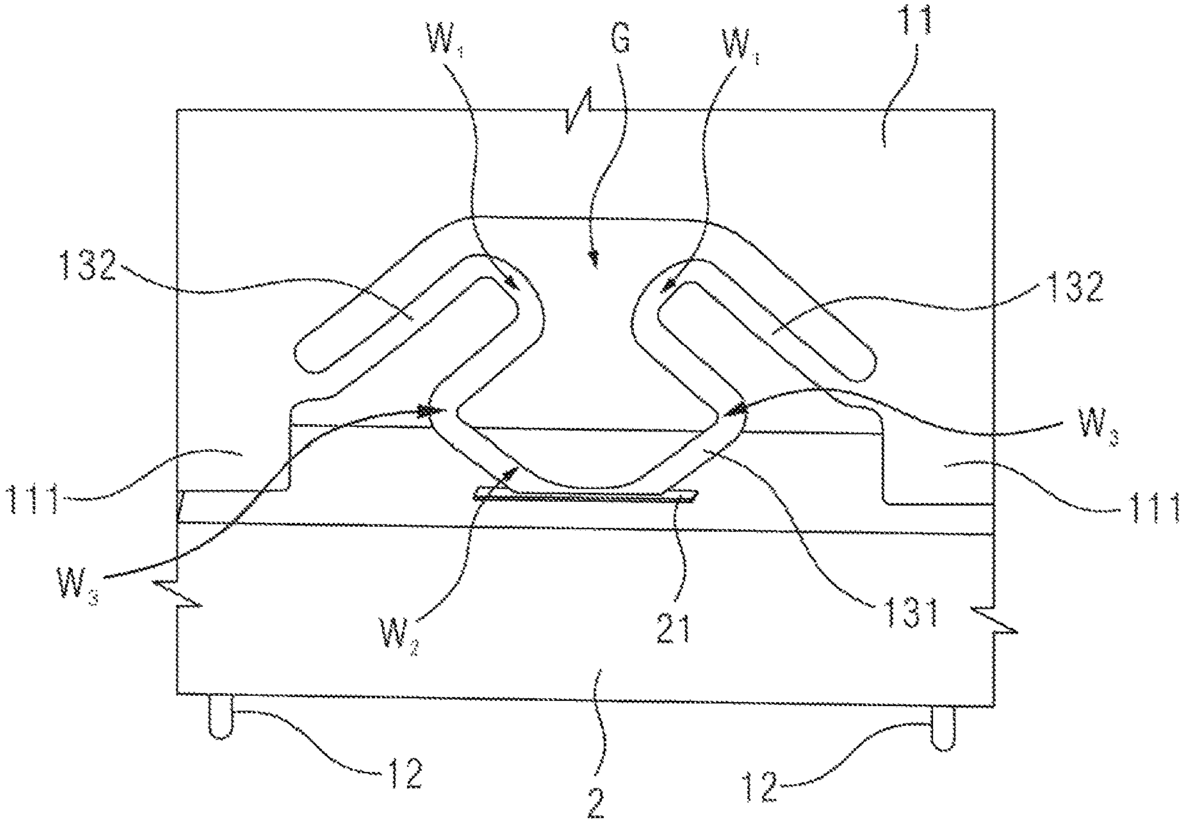
FIG. 3 is a partial schematic side view showing the conductive housing of the disclosure plugged into a PCB.

With reference to FIGS. 2 and 3, the conductive housing 1 may further comprise a plurality of terminal pins 12, for example, fish-eye terminal pins. Each of the plurality of terminal pins 12 is connected to a respective terminal connection portion 111 to form a terminal. Preferably, the side surface 11 (and the terminal connection portion 111 thereof) and the terminal pin 12 of the conductive housing 1 may be integrally formed by stamping a single material. The conductive housing 1 may be made from a metallic and conductive material, and the side surface 11 (and the terminal connection portion 111 thereof) and the terminal pin 12 of the conductive housing 1 may be integrally formed by stamping a single metal material, such as a metal sheet or a metal plate.

With reference to FIGS. 1 to 3, the conductive housing 1 may further comprise at least one conductive elastic piece 13. One conductive elastic piece 13 is connected between two adjacent terminal connection portions 111 to at least partially cover a gap G between the two adjacent terminal connection portions 111, and the conductive elastic piece 13 is separated from the edge portion of the side surface 11 between the two adjacent terminal connection portions 111 by a distance, or even connected to the edge portion of the side surface 11 between the two adjacent terminal connection portions 111. Further, two opposite ends of one conductive elastic piece 13 is connected to two respective and adjacent terminal connection portions 111 respectively, or connected to the edge portion of the side surface 11 between two respective and adjacent terminal connection portions 111, or connected to connections or interface points of two respective and adjacent terminal connection portions 111 with the edge portion of the side surface 11 between the two respective and adjacent terminal connection portions 111, so as to cover the gap G between the two adjacent terminal connection portions 111, in other words, the conductive elastic piece 13 connected between two adjacent terminal connection portions 111 forms a hollowed-out pattern, a large-area pattern or a non-hollowed-out pattern to cover the respective gap G, and also can cover an area between terminal pins 12 connected to the two respective and adjacent terminal connection portions 111. The conductive elastic piece 13 covers most areas between the terminal connection portions 111 and/or between the terminal pins 12 to enhance electromagnetic compatibility.

Preferably, the conductive elastic piece 13, as well as the side surface 11 (and the terminal connection portion 111 thereof) and the terminal pin 12 of the conductive housing 1, may also be integrally formed by stamping a single material. The foregoing stamping manufacturing has a simple process, a low cost, and a low defective rate. Further, the conductive housing 1 and the conductive elastic piece 13 are not always in a conductive state, but can also be in the conductive state or electrically connected with other electronic elements or PCB as needed, but the disclosure is not limited thereto.

With reference to FIGS. 2 and 3, further, a bottom end of each terminal connection portion 111 may be connected to a respective terminal pin 12, that is, the terminal pin 12 is arranged perpendicular to an edge portion of a respective side surface 11 of the terminal connection portion 111, and the terminal pin 12 extends downward from the bottom end of the terminal connection portion 111 in a direction parallel to an extension direction of the terminal connection portion 111 connected thereto, wherein a connection line L between bottom ends of two adjacent terminal connection portions 111 intersects with a part of a respective conductive elastic piece 13 connected between the two adjacent terminal connection portions 111, in other words, at least a part of the conductive elastic piece 13 (for example, a lower part of the conductive elastic piece 13 or a part of the conductive elastic piece 13 away from the bottom or bottom edge of the respective side surface 11, as shown in FIG. 2) may intersect with the connection line L at a point, or at least a part of the conductive elastic piece 13 extends beyond the connection line L, that is, at least a part of the conductive elastic piece 13 extends from one side of the connection line L to the other side thereof in a direction away from the bottom or bottom edge of the respective side surface 11, and further, the connection line L between the bottom ends of two adjacent terminal connection portions 111 is transversely connected, and the connection line L may even be parallel to the bottom or a bottom edge of the side surface 11 to which two adjacent terminal connection portions 111 are connected. The connection line L is formed with the aforementioned one side and the other side opposite to each other in a direction parallel to a direction wherein the terminal connecting portion 111 pointing to the terminal pin 12 connected thereto. That is, the connection line L divides the gap G or area between the two adjacent terminal connection portions 111 into two small areas in a vertical direction, the two small areas being defined as the one side and the other side mentioned previously. One side of the connecting line L is close to the bottom or bottom edge of the side surface 11, and the other side of the connecting line L is close to the terminal pin 12. At least a portion of the conductive elastic piece 13 extends in a direction away from the bottom or bottom edge of the respective side surface 11 and intersects with or extends beyond the connecting line L. Thus, when the connector 100 is arranged on a PCB 2, that is, when the plurality of terminal pins 12 of the conductive housing 1 are installed (for example, plugged and surface-mounted) in the PCB 2, for example, when the plurality of terminal pins 12 are plugged in the PCB 2, bottom ends of the terminal connection portions 111 may abut against or not abut against the PCB 2, or may be partially plugged in the PCB 2, and since at least a part of the conductive elastic piece 13 intersects with the connection line L, an interference fit is formed between the conductive elastic piece 13 and the PCB 2. Such conductive elastic piece 13 has elasticity and can be in interference fit with the PCB 2, such that contact is reliable and the conductive housing 1 can be repeatedly installed or plugged.

As shown in detail in FIGS. 2 and 3, the conductive elastic piece 13 may comprise an abutting portion 131 and two elastic arm portions 132. The abutting portion 131 is connected between the two elastic arm portions 132, and each of the two elastic arm portions 132 is connected between the abutting portion 131 and a respective terminal connection portion 111, that is, a first end of one of the two elastic arm portions 132 and a first end of the other of the two elastic arm portions 132 is connected to respective terminal connection portions 111 separately, and a second end of one of the two elastic arm portions 132 and a second end of the other of the two elastic arm portions 132 is connected to two opposite ends of the abutting portion 131 separately. When the plurality of terminal pins 12 of the conductive housing 1 are installed in the PCB 2, that is, when the plurality of terminal pins 12 are plugged in the PCB 2, the abutting portion 131 is configured to abut against the PCB 2. Preferably, the abutting portion 131 and the two elastic arm portions 132 may be integrated; the abutting portion 131 and the two elastic arm portions 132 of the conductive elastic piece 13 and the side surface 11 (and the terminal connection portion 111 thereof) of the conductive housing 1 may also be integrally formed by stamping a single material.

As shown in detail in FIG. 3, a pad 21 may be arranged on the PCB 2, wherein the pad 21 may be configured to fix an element or to generate a friction force between the pad 21 and an element or to be grounded. For example, the pad 21 arranged on the PCB 2 may be made from a conductive material and is configured to be grounded, and the pad 21 may be electrically connected or connected to the ground layer or ground wire of the PCB 2. When the conductive housing 1 is installed on the PCB 2, the conductive elastic piece 13 (especially the abutting portion 131) abuts against the pad 21 of the PCB 2, such that the side surface 11, the terminal pin 12 and the conductive elastic piece 13 of the conductive housing 1 and the PCB 2 realize a common grounding, in other words, the side surface 11, the terminal pin 12 and the conductive elastic piece 13 of the conductive housing 1 and the pad 21 of the PCB 2 can be electrically connected or connected to each other to establish a common grounding, therefore, the conductive housing 1 and the PCB 2 realize a common grounding.

In addition, the conductive elastic piece 13 (especially the abutting portion 131) may directly abut against the PCB 2 rather than the pad 21 of the PCB 2; or the conductive elastic piece 13 (especially the abutting portion 131) may abut against the pad 21 of the PCB 2 (for example, the pad is not configured to be grounded) so as to be more firmly located on the PCB 2; or among the plurality of conductive elastic pieces 13, a part of the conductive elastic piece 13 directly abuts against the PCB 2 and/or the other part of the conductive elastic piece 13 abuts against the pad 21 of the PCB 2 and the pad 21 may be configured to be grounded or not to be grounded.

As shown in detail in FIG. 3, each of the two elastic arm portions 132 may comprise at least one bent portion defined as at least one first bent portion $W_1$. Alternatively, at least one of the two elastic arm portions 132 may comprise at least one first bent portion $W_1$. Such first bent portion $W_1$ can not only enhance elasticity of the elastic arm portion 132, but also occupy more of the gap G between two adjacent terminal connection portions 111, so as to enhance the electromagnetic compatibility.

As shown in detail in FIG. 3, the abutting portion 131 may comprise a bent portion defined as a second bent portion $W_2$, a bending direction of the second bent portion $W_2$ being the same as a direction in which the terminal connection portion 111 points toward a respective terminal pin 12, in other words, the bending direction of the second bent portion $W_2$ being parallel to and in the same direction to the direction in which the terminal connection portion 111 points toward a respective terminal pin 12, but the disclosure is not limited thereto. The bending direction of the second bent portion $W_2$ is not necessarily the same as the direction in which the terminal connection portion 111 points toward a respective terminal pin 12, and also is capable of being inclined relative thereto, or the abutting portion 131 includes a plurality of second bending portions W 2 and the bending directions of the second bending portions $W_2$ are the same or the adjacent second bending portions $W_2$ are bent in different directions, as long as the abutting portion 131 of the conductive elastic piece 13 can be elastically deformed to form interference fit with the PCB 2 when the plurality of terminal pins 12 of the conductive housing 1 are installed in the PCB 2. Further, the conductive elastic piece 13 may even be elastically pressed against the PCB 2 by the abutting portion 31.

With reference to FIGS. 2 and 3, a bending direction of the first bent portion $W_1$ can be substantially the same as or opposite to the bending direction of the second bent portion $W_2$; and when the bending direction of the first bent portion $W_1$ is substantially opposite to the bending direction of the second bending portion $W_2$, the bending direction of the first bent portion $W_1$ may extend from the PCB 2 toward the edge portion of the side surface 11, in other words, a bending direction of the bent portion is parallel to a direction in which the terminal connection portion points toward the respective terminal pin, and the bending direction of the first bent portion $W_1$ may be away from the terminal connection portion 111 and extend upward or toward the edge portion of the side surface 11, or may even extend upward or toward the edge portion of the side surface 11 in a manner of being inclined or forming an angle between the first bent portion $W_1$ and a respective terminal connection portion 111, but the disclosure is not limited thereto. As shown in FIGS. 2 and 3, bending directions of two first bent portions W 1 may be slightly opposite to each other, or the two first bending portions W 1 are arranged to mirror each other. Further, the conductive elastic piece 13 may even be formed or connected, as a strip-shaped elastic piece, between two adjacent terminal connection portions 111, and the strip-shaped elastic piece may be bent in the direction in which the terminal connection portion 111 points toward the respective terminal pin 12 or along the terminal connection portion 111 toward the edge portion of the side surface 11 to form the first bent portion $W_1$ and/or the second bent portion $W_2$ as required, but the disclosure is not limited thereto.

With reference to FIGS. 2 and 3, at the connections between the two elastic arm portions 132 and the abutting portion 131, that is, at the connection between the adjacent and connected first bending portion $W_1$ and second bending portion $W_2$, the conductive elastic piece 13 may further comprises at least one third bending portion $W_3$, and a bending direction of the third bending portion $W_3$ extends parallel to the edge portion of the side surface 11 and toward the respective and adjacent terminal connection portion 111. Therefore, the conductive elastic piece 13 between two adjacent terminal connection portions 111 may define two third bending portions $W_3$, and the bending directions of the two third bending portions $W_3$ are opposite to each other or the two third bending portions $W_3$ extend away from each other in a direction parallel to the edge portion of the side surface 11 and toward the respective and adjacent terminal connection portions 111. In other words, the two third bending portions $W_3$ are arranged to mirror each other.

With reference to FIGS. 2 and 3, two adjacent terminal connection portions 111, the conductive elastic piece 13 connected between the two adjacent terminal connection portions 111, and a respective side surface 11 may form a closed loop. The conductive elastic piece 13 arranged in this way has good mechanical properties, a small yield and a small contribution to a pressing force, but the disclosure is not limited thereto. In an embodiment not shown, the conductive elastic piece 13 may be disconnected at a middle position of the abutting portion 131.

In addition, it is preferred that at least one of the side surfaces 11, the plurality of terminal pins 12 and at least one conductive elastic piece 13 are integrated, and are especially integrally formed by stamping a single material.

The above descriptions are merely the preferred embodiments of the disclosure and are not intended to limit the disclosure; and for a person skilled in the art, the disclosure may have various modifications and variations. Any modifications, equivalents, improvements, etc. made within the spirit and principle of the disclosure shall all fall within the scope of protection of the disclosure.

What claimed is:

1. A conductive housing for a connector, comprises:

a plurality of side surfaces, at least one of which comprising a plurality of terminal connection portions spaced apart from one another at an edge portion of the side surface, a gap being formed between two adjacent terminal connection portions;

a plurality of terminal pins, each of which being connected to the respective terminal connection portion; and at least one conductive elastic piece, one of which being connected between the two adjacent terminal connection portions to at least partially cover the gap between the two adjacent terminal connection portions, wherein a bottom end of each of the plurality of terminal connection portions is connected to the respective terminal pin, wherein an interference fit is formed between the conductive elastic piece and a printed circuit board (PCB) when the plurality of terminal pins of the conductive housing are installed in the PCB.

2. The conductive housing according to claim 1, wherein a connection line between the bottom ends of the two adjacent terminal connection portions intersects with a part of the respective conductive elastic piece connected between the two adjacent terminal connection portions.

3. The conductive housing according to claim 1, wherein each of the at least one conductive elastic piece comprises:

an abutting portion; and two elastic arm portions, the abutting portion being connected between the two elastic arm portions, and each of the two elastic arm portions being connected between the abutting portion and the respective terminal connection portion.

4. The conductive housing according to claim 3, wherein the abutting portion and the two elastic arm portions are integrated.

5. The conductive housing according to claim 3, wherein the abutting portion is configured to abut against the PCB when the plurality of terminal pins of the conductive housing are installed in the PCB.

6. The conductive housing according to claim 3, wherein at least one of the two elastic arm portions comprises at least one first bent portion.

7. The conductive housing according to claim 6, wherein the abutting portion comprises a second bent portion, a bending direction of the second bent portion being the same as a direction in which the terminal connection portion points toward the respective terminal pin, wherein a bending direction of the first bent portion is the same as or opposite to the bending direction of the second bent portion.

8. The conductive housing according to claim 3, wherein the abutting portion comprises a bent portion, a bending direction of the bent portion being the same as a direction in which the terminal connection portion points toward the respective terminal pin.

9. The conductive housing according to claim 3, wherein the abutting portion or at least one of the two elastic arm portions comprises a bent portion, a bending direction of the bent portion being parallel to a direction in which the terminal connection portion points toward the respective terminal pin, the bending direction of the bent portion being away from the terminal connection portion and extending upward or toward the edge portion of the side surface, or may even extend upward or toward the edge portion of the side surface in a manner of being inclined or forming an angle between the bent portion and a respective terminal connection portion.

10. The conductive housing according to claim 1, wherein the two adjacent terminal connection portions, the conductive elastic piece connected between the two adjacent terminal connection portions, and the respective side surface form a closed loop.

11. The conductive housing according to claim 1, wherein at least one of the plurality of side surfaces, the plurality of terminal pins, and the at least one conductive elastic piece are integrated.

12. The conductive housing according to claim 1, wherein two opposite ends of the conductive elastic piece are connected to two respective and adjacent terminal connection portions respectively, or connected to the edge portion of the side surface between two respective and adjacent terminal connection portions, or connected to interface points of two respective and adjacent terminal connection portions with the edge portion of the side surface between the two respective and adjacent terminal connection portions.

13. The conductive housing according to claim 1, wherein the conductive elastic piece covers an area between terminal pins connected to the two respective and adjacent terminal connection portions.

14. A connector comprising the conductive housing according to claim 1.

15. A connector, comprises:

a conductive housing comprises:

a plurality of side surfaces, at least one of which comprising a plurality of terminal connection portions spaced apart from one another at an edge portion of the side surface, a gap being formed between two adjacent terminal connection portions;

a plurality of terminal pins, each of which being connected to the respective terminal connection portion; and at least one conductive elastic piece, one of which being connected between the two adjacent terminal connection portions to at least partially cover the gap between the two adjacent terminal connection portions; and at least one connector body, the conductive housing at least partially surrounding the connector body, wherein a bottom end of each of the plurality of terminal connection portions is connected to the respective terminal pin, wherein an interference fit is formed between the conductive elastic piece and a printed circuit board (PCB) when the plurality of terminal pins of the conductive housing are installed in the PCB.

* * * * *